United States Patent [19]

Jandrasi et al.

[11] 3,964,507

[45] June 22, 1976

[54] SLIDE VALVE WITH INTEGRATED REMOVABLE INTERNALS

[75] Inventors: Frank J. Jandrasi; Howard A. Purvis, both of Houston, Tex.

[73] Assignee: Tapco International, Inc., Houston, Tex.

[22] Filed: Jan. 13, 1975

[21] Appl. No.: 540,674

[52] U.S. Cl. .............................. 137/375; 251/326
[51] Int. Cl.² .......................................... F16K 3/30
[58] Field of Search ............ 137/375; 251/147, 326, 251/328, 329

[56] References Cited
UNITED STATES PATENTS

| | | | |
|---|---|---|---|
| 2,636,712 | 4/1953 | Lubbock | 251/326 X |
| 2,787,438 | 4/1957 | Bauer | 251/326 |
| 3,701,359 | 10/1972 | Worley et al. | 137/375 |
| 3,726,306 | 4/1973 | Purvis | 137/375 |

*Primary Examiner*—Henry T. Klinksiek
*Attorney, Agent, or Firm*—Fulbright & Jaworski

[57] ABSTRACT

A slide valve with integrated removable internals which can operate with fully reversing pressures in a high pressure, high temperature, erosive solid or fluid flow system is disclosed which includes a body having a flow passage through it including a large internal portion, a body portion projecting into the enlarged internal portion, preferably a cone suspended in non-external load bearing relation with the body, a valve surface or orifice plate releasably secured on the projecting body portion, and a slide valve slideable in the enlarged internal portion adjacent the valve surface having side portions extending transversely of the direct flow passage in the enlarged internal portion. Traversely spaced guides are disposed in the enlarged internal portion, either releasably secured to the valve surface or formed integrally with the valve surface which are in the form of side members. The transversely extending portion of the slide valve has slides that interfit with the guides so that the slide valve is guided adjacent the valve surface into open and close position and out of the direct flow path through the flow passage. The valve may have a single slide valve or a double slide valve arranged in end-to-end relationship for opening and closing the valve. Preferably the support cone is made up of material different from the valve body and is supported on a body ledge with a bi-metallic weld between the column and the body that is not subject to external load. Preferably, the body has an external shell constructed of low cost, low temperature materials, includes insulation material which reduces heat flow and includes an erosion-resistant surface or lining. Advantageously, a removable bearing sleeve with a removable insulation assembly are included in the valve. Other features are disclosed.

15 Claims, 7 Drawing Figures

Fig. 3

SLIDE VALVE WITH INTEGRATED REMOVABLE INTERNALS

BACKGROUND OF THE INVENTION

In refineries and solids-handling systems, there is a need for a slide valve which can operate with fully reversing pressures in high pressure, high temperature erosive solid or fluid systems, which has readily removable wear-prone components, externally setable and non-changing clearances without the necessity of removing the valve from the line. Some valves in use today provide none of the above features, while others are removable with some difficulty and may be resetable externally but in operations their settings can change. In addition, slide valves currently in use have separate discs and guides with the guides bolted in the body and with clearances that can and do change.

SUMMARY

The present invention is directed to a slide valve which includes integrated and removable valve internal components and which can operate with fully reversing pressures in high pressure, high temperature, erosive, solid or fluid flow systems.

The present invention is directed to such a valve which has integrated, removable valve internal components assembly consisting of a valve surface or orifice plate, guide and guide support for a slide valve having interfitting slides in the guides for guiding the slide valve into and out of open and closed positions.

It is a further object of the present invention to provide such a slide valve which includes a support cone having a valve surface, which support cone is supported in the body in a non-external load-bearing manner to maintain clearances that remained fixed regardless of temperature and pressure excursions.

It is a further object of the present invention to provide such a slide valve having an integrated, removable valve internal components assembly which has coacting tapered runs and runners on the valve surface of plate and guide members that permits removal of clearances between the assembly and the valve surface or plate so that the valve is capable of operating under reverse flow conditions.

A further object of the present invention is the provision of such a slide valve which includes an integrated assembly in which the guides are a rigid part of the assembly thus permitting externably settable clearances that remain fixed regardless of temperature or pressure excursions.

It is a further object of the present invention to provide such a valve which is capable of operating at high temperatures and pressures, which has interfitting guides and slides located out of the direct flow path through the valve, one which minimizes the transmission of heat from the flow stream of the valve body and whose external shell is constructed of low cost, low temperature materials, and one which has a removable bearing sleeve with a removable insulation assembly that reduces heat flow.

A further object of the present invention is the provision of such a slide valve which includes an integrated valve internal components assembly and a cone plate system that includes a tapered runner assembly which permits easy breakaway in case of solids buildup or metallizing.

A further object of the present invention is the provision of such a slide valve which may have either a single slide valve or a pair of slide valves arranged in end-to-end relationship for opening and closing of the valve.

Other and further objects, features and advantages will be apparent from the following description of presently preferred embodiments of the invention given for the purpose of disclosure when taken in conjunction with the accompanying drawings.

BRIEF DESCRIPTION OF THE DRAWINGS

Like character references designate like parts throughout the several views of the drawings in which.

DESCRIPTION OF THE PREFERRED EMBODIMENTS

Figures 1, 2:
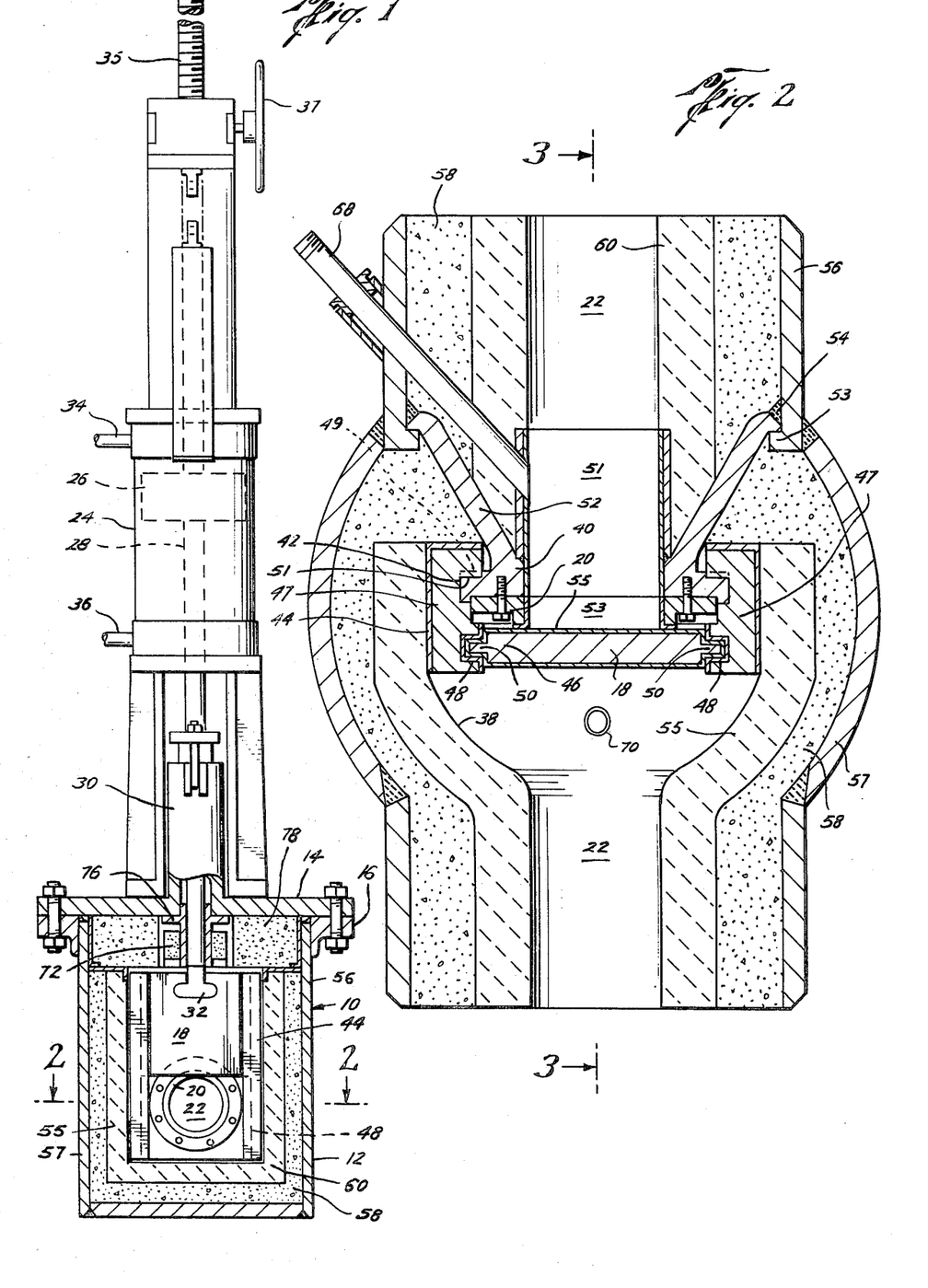
FIG. 1 is an elevational view, partly in section, of a slide valve with integrated removable internals according to the invention.
FIG. 2 is an enlarged cross-sectional view taken along the line 2—2 of FIG. 1.

Referring now to the drawings and particularly to FIG. 1, the reference numeral 10 generally designates the slide valve which includes the valve body 12 which is closed by the removable flanged bonnet or cover 14 bolted to the body flange 16. The bonnet or cover 14 is of a size large enough to insert in and withdraw from the valve body wear-prone internals when the bonnet or cover is removed.

Disposed within the valve body 12 is a slide valve 18 and a disc-like valve member 20 having a valve surface or seat, sliding movement of the slide valve 18 across the valve surface of the valve member 20 opening and closing the flow passage 22 extending through the valve body 12.

Any suitable means may be provided for sliding the slide valve 18 into open and closed position; however, for refinery and other commercial operations, valves of the type of the present invention are open and closed remotely as part of the valve system. To this end, there is provided a cylinder 24 having the piston 26 and attached piston rod or actuator stem 28 which extends through the stuffing box 30 and is connected at 32 to the slide valve 18 in the usual manner. Hydraulic or pneumatic pressure is provided through the lines 34 and 36 to cause movement of the piston 26 and thereby the stem 18 and the slide valve 18 for moving into open and closed positions.

Manual means are also provided for opening and closing the slide valve 18 which include the threaded shaft 35 connected to the stem 28 and hand wheel 37, rotation of the hand wheel 37 causing a corresponding movement of the threaded shaft 35 which, in turn, causes a corresponding movement of the stem 28 which, in turn, moves the slide valve 18.

No more description is given or deemed necessary of the means illustrated for opening and closing the slide valve 18 and the stuffing box 30, the threaded shaft 35 and hand wheel 37, as any desired means may be utilized, manual, hydraulic, pneumatic and the like to open and close the valve.

Figure 3:
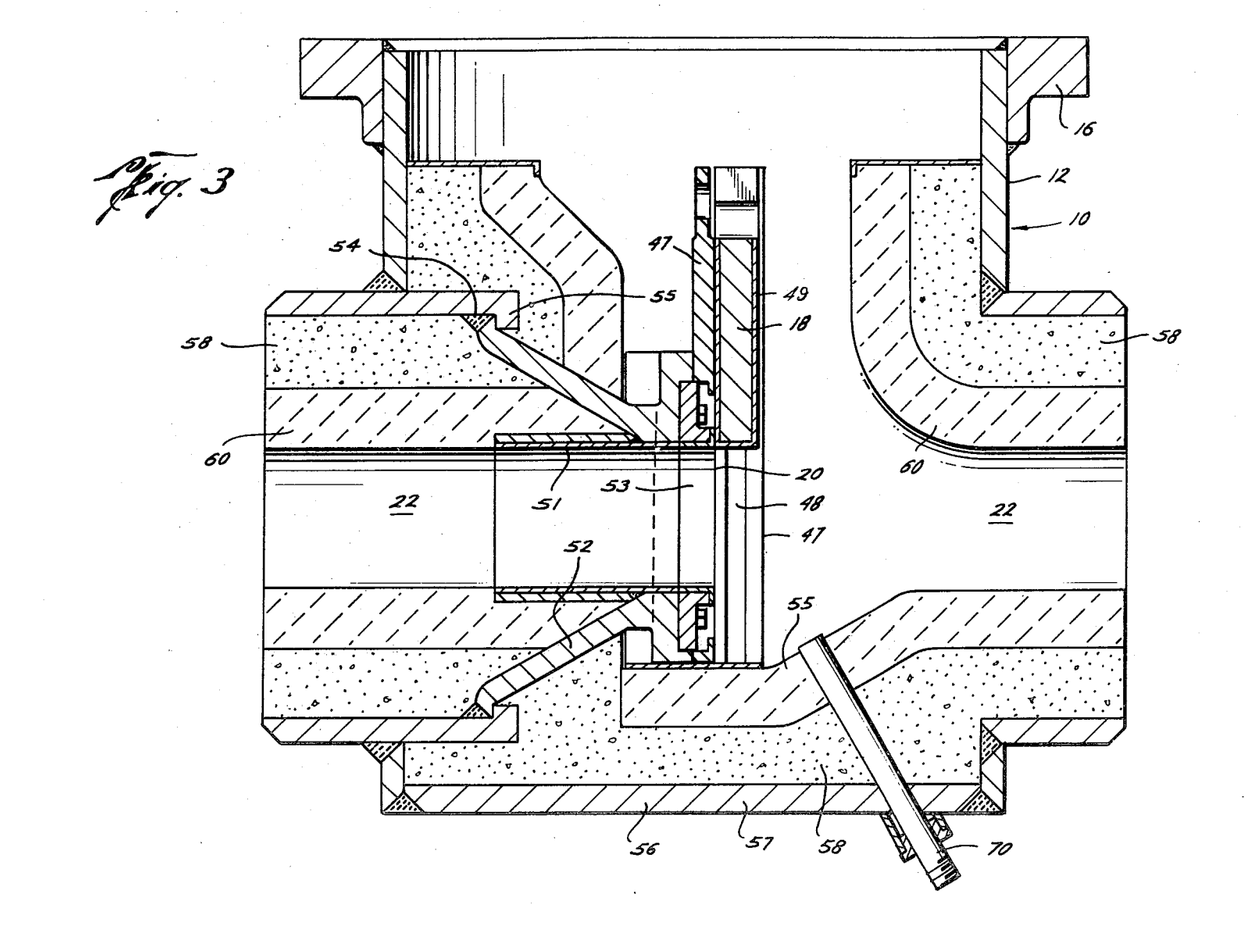
FIG. 3 is a sectional view taken along the line 3—3 of FIG. 2.

Referring now to FIGS. 2 and 3, the flow passage 22 extends through the valve body 12, as previously mentioned, which is provided with an enlarged internal portion 38 into which a body portion 40, preferably a cylindrical portion having the valve surface or plate 20 releasably secured to it, projects which provide transversely extending sides 42 spaced from the internal walls 44 of the enlarged portion 38.

The slide valve 18 is slideable in this enlarged internal portion 38 adjacent the valve surface or plate 20 and includes the transversely extending side members which extend beyond the direct flow in the flow passage 22.

A pair of transversely spaced side members 47 are provided in the enlarged portion 38 of the flow passage 22 and are slideably secured to the projecting side members 42 by means of the tapered runs and runners 49 and 51. The side members are provided with the transversely spaced guides 48 disposed away from and out of the direct flow path through the flow passage 18 into which the slides 50 project. Thus, the slide valve 18 is guided throughout its movement by the interfitting guides and slides 48 and 50, yet, at the same time, the guides and slides are disposed out of the direct flow path through the flow passage 22 in the valve body 12. In addition, the side members 47 are releasably secured to the projecting side member 42 by the tapered runs and runners 49 and 51 which permits removal of clearances between the slide valve guides and slides and the support projecting body portion 40 and the plate 20 which locks the side members 47 to the projecting body portion 40 so that the valve is capable of operating under reverse flow conditions.

In assembling the valve internals, the side members 47 with the guides 48 and the disc-like valve member 20 with the valve seat are slid into place as illustrated in FIGS. 2 and 3 with the disc-like valve member 20 spaced from the recessed portion of the projecting body portion 40. The disc-like valve member is then snapped into place as illustrated in FIGS. 2 and 3, which locks the side members 47 to the projecting body portion 40. The valve member is then bolted to the projecting body. To remove the valve member 20 and the valve guides 48, the procedure is reversed. Thus, the wear-prone valve internals, the guides, slides and valve seat or surface are all readily removable and insertable through the valve bonnet or cover opening for repair or replacement without removing the valve from the line, yet a rigid assembly permitting of externally settable clearances that remain fixed regardless of temperature or pressure excursions is provided.

If desired, of course, the grooves and projections of the slides 48 and the guides 50 may be reversed, it being an important aspect of the present invention, however, that the guides are releasably secured to the projecting body portion, as previously described, and provide clearances that remain fixed regardless of temperature or pressure excursions. In addition, the valve member 20 and the recess into which it snugly fits in the projecting body portion 40 may be of any desired shape.

Preferably the projecting body portion 40 of the flow passage 22 is part of a truncated cone 52 which is suspended from the valve body 12 in a non-external load-bearing relation, by means of the internal annular body ledge 52 and the bimetallic weld 54.

The body 12 comprises an outer shell 56 which can be constructed of low cost, low temperature material such as carbon steel and includes the insulation 58 which is a castable insulation, many of which are readily available on the open market, such as Resco RS-7.

Figure 4:
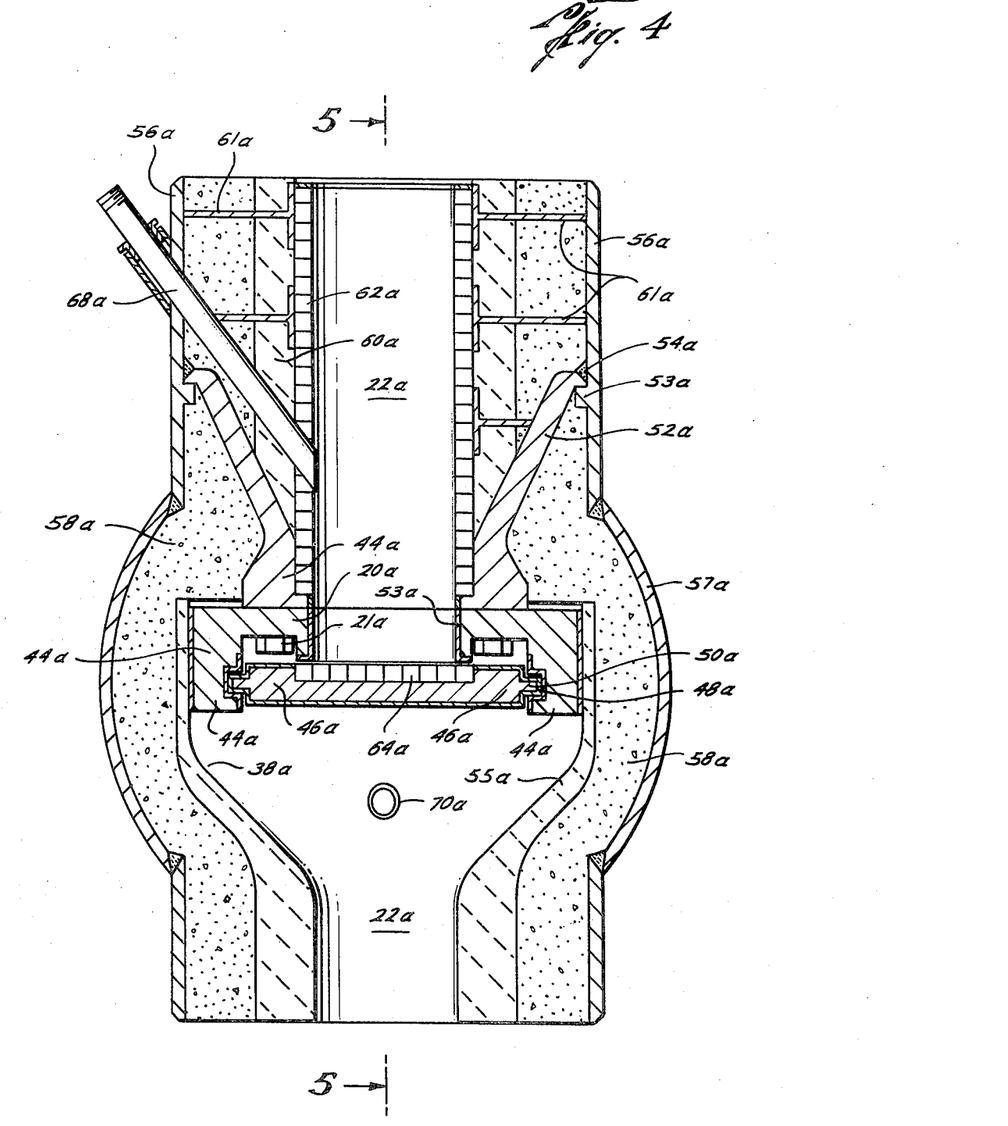
FIG. 4 is a view similar to that of FIG. 2, illustrating another embodiment of the slide valve with integrated removable internals according to the invention.
Figure 5:
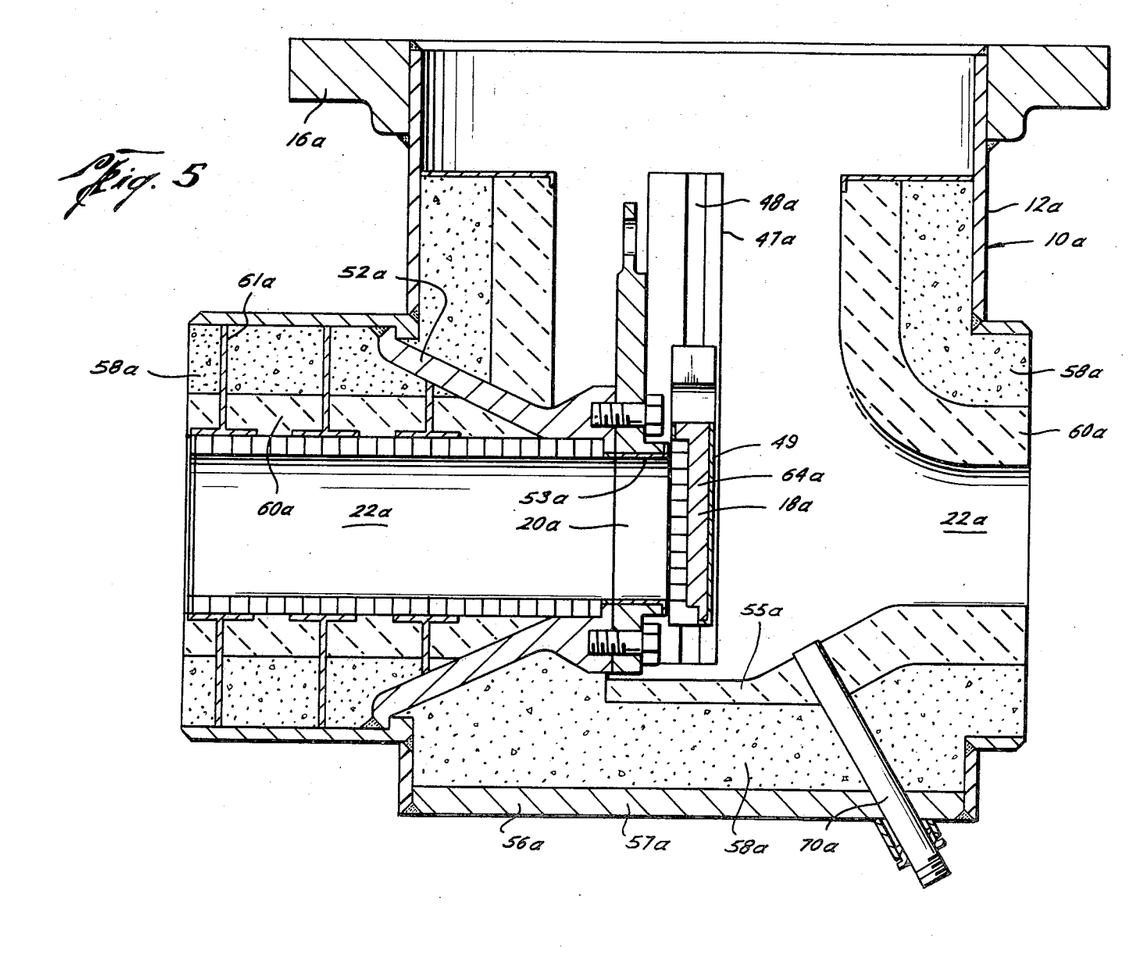
FIG. 5 is a sectional view taken along the line 5—5 of FIG. 4.

If desired, and as illustrated in the modification of FIGS. 4 and 5, an inner layer of refractory material 62a, such as formed of hexmesh and refractory material, many of which are commercially available such as Resco RA-22, may be provided and which is spaced from the outer body shell 56a by the T-shaped standoffs 61a.

Referring again to FIGS. 3 and 4, the passage 22 adjacent the truncated cone 52 is lined by a suitable lining material 51, such as Tapco 275, a commercial hardfacing. Similar linings are provided at 53 for the orifice plate or valve seat and at 49 in the slide valve 18. Similarly, the guides and slides are lined as illustrated by Tapco 6. If desired, however, and referring to FIGS. 4 and 5, the slide valve 10 may also be lined with a refractory material, such as hexmesh and refractory, as at 64a.

Referring again to FIGS. 3 and 4, a pair of purge and lanceports 68 and 70 are disposed in the passageway 22 through the valve body for purging and cleaing out the flow passage, which are normally closed by caps, not shown.

Referring now to FIGS. 4 and 5, which illustrate a modification, and in which the reference letter a has been added to designate parts corresponding to those of FIGS. 1–3, the primary difference is that the cylindrical body portion 44a projecting into the passage 22a is shortened and the valve member or plate 20a having the valve surface or seat has the side arms 44a integral with it, which includes the guides 48a, so that the valve member 20a and side arms 44a with the valve guides 48a are combined into a single rigid unit and are releasably secured to the projection portion 44a by means of the bolts 21a. Thus, a fixed relationship is provided between the interfitting slides 50a and guides 48a supported by the cone 44a which permits externally settable clearances which remain fixed regardless of temperature or pressure excursions, and the valve internals, that is the valve member 20a and valve guides 48a, are removable through the opening normally closed by the bonnet of the valve 10 for repairs and replacement of parts without the necessity or removing the valve 10 from the line for repair of these wear-prone parts.

The other parts, with the exception of the refractory layers 62 and 64a in the passage 22a in the slide valve 18a, respectively, together with the T-shaped standoffs 61a, assembly and operation are the same as those indicated with respect to FIGS. 1—3 and, accordingly, no more description of the embodiments of FIGS. 4 and 5 is deemed necessary or given.

Figures 6, 7:
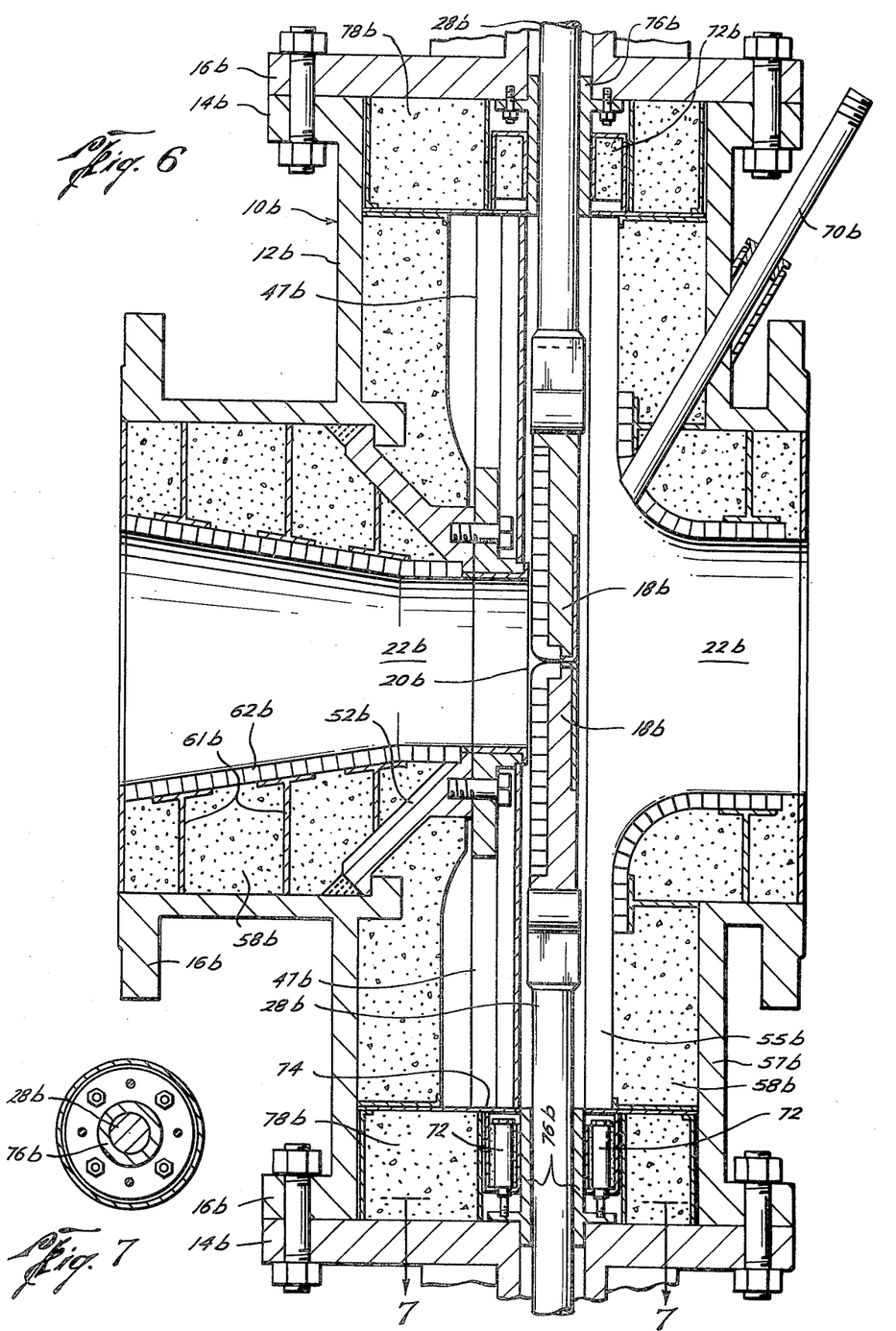
FIG. 6 is an enlarged elevational view similar to that of FIG. 1, illustrating a pair of slide valves for opening and closing the flow passage through the valve.
FIG. 7 is a sectional view taken along the line 7—7 of FIG. 6.

Referring now to FIGS. 6 and 7, a further modification is illustrated in which the reference letter b has been added to numerals corresponding to those of the preceding figures and in which a pair of slide valves 18b are provided with associated cylinders, pistons and the like, not shown, which move the stems 28b for moving the slide valve members 18b into and out of closed and open positions for closing and opening the flow passage 22b through the valve body 10b. When closed, the two slide valves 18b, which are arranged in end-to-end relationship with respect to one another and which are guided in their sliding movement in the same way as the interfitting guides and slides of the embodiments of FIGS. 1–5 meet in the middle portion of the flow passage 22b to close that passage as illustrated in FIG. 6, and which slide valve members 18b are moved apart to opposite sides of the flow passage 22b to open the passage.

All other parts and mode of operation of FIGS. 6 and 7 are the same as described in connection with the preceding FIGS. 1–5, and, accordingly, no more description thereof is deemed necessary or given.

Preferably, the body of the valve includes an inner shell 55 and an outer shell 57 (55a and 57a in FIGS. 4 and 5, and 55b and 57b in FIG. 6) to provide a space for the insulation 58. A compartment is disposed adjacent and under the bonnet or cover 14 into which is removably disposed additional insulation 78 to prevent transmission of heat to the bonnet or cover 14. To assist in locating this additional insulation, the spacing bolts 72 are provided as illustrated in FIGS. 6 and 7, and are covered by the cover plates 74 to keep the bolt heads free from metalizing and solids buildup. In addition, this arrangement provides for a removable bearing sleeve 76 as well as the removable insulation assembly 78 (FIG. 1) and 78b (FIGS. 6 and 7) so that these wear-prone parts can be removed and repaired or replaced through the valve bonnet opening and without the necessity of removing the entire valve from the line when these parts need repairs or replacement.

The present invention, therefore, is well suited and adapted to attain the objects and ends and has the advantages and features mentioned as well as other inherent therein. While presently-preferred embodiments in the invention have been given for the purpose of disclosure, changes in details and arrangement of parts may be made which are in the spirit of the invention as defined by the scope of the appended claims.

What is claimed is:

1. A slide valve with removable integrated internals comprising,
   a body provided with a flow passage therethrough including an enlarged internal portion,
   a body portion connected at one end to the body and having a projecting portion extending into the enlarged internal portion, the projecting portion having its sides spaced from internal walls of the enlarged internal portion thereby forming a transverse space on each side of the projecting portion out of direct flow through the flow passage,
   a valve seat having a valve surface releasably secured on the projecting portion,
   a slide valve slidable in the enlarged internal portion adjacent the valve surface and having side members extending transversely into the transverse space, and
   interfitting guides and slides operable for guiding the slide valve into open and closed positions adjacent the valve surface,
   the slides being disposed on the side members of the slide valve,
   the guides being releasably secured to the projecting portion and being disposed in the transverse space and spaced from the internal walls of the enlarged internal portion and out of the direct flow through the flow passage,
   whereby the valve seat and guides are integrated by both being releasably secured to the projecting portion and are out of direct contact with the body thereby permitting external setable clearances between the valve seat and the slide valve which remain fixed under temperature or pressure excursions,
   the body provided with an opening of a size permitting insertion in and withdrawal from the body of the valve seat, the slide valve and its slides, and the guides therethrough, and
   a closure removably secured to the body closing the opening.

2. The slide valve of claim 1, where,
   the body portion is a cone having a cylindrical portion forming the projecting portion.

3. The slide valve of claim 1, where,
   the body portion is a cone having a cylindrical portion forming the projecting portion, and,
   the cone is suspended from the body in external load-free relationship with respect to the body.

4. The slide valve of claim 1 including,
   transversely—spaced side members disposed in the transverse space of the enlarged internal portion and out of the direct flow path, the guides being disposed in the side members, and
   means releasably securing the side members to the projecting body portion.

5. The slide valve of claim 1 where,
   the valve seat includes tansversely-spaced integral side members extending in the transverse space in the enlarged internal portion out of the direct flow path, and the pair of interfitting guides are disposed in the side members.

6. The slide valve of claim 1 where,
   the slide valve comprises a pair of slide valves disposed in end-to-end relationship with respect to one another for opening and closing the valve.

7. The slide valve of claim 1 including,
   a bearing sleeve removably secured to the valve body, and
   an actuator stem movably extending through the bearing sleeve and secured to the side valve operable to actuate the slide valve to open and close positions.

8. The slide valve of claim 1 where,
   the body includes an outer shell and an inner shell to provide an insulation space about the flow passage, the enlarged internal portion, and substantially all of the projecting portion and the valve seat, and includes an insulating compartment adjacent the removable cover and including,
   insulating material disposed in the insulation space,
   additional insulation material removably disposed within the insulating compartment,
   the removable cover including an opening, a bearing sleeve removably disposed in the insulating compartment in communication with the opening and the slide valve, and
   an actuator stem movably extending through the opening and the bearing sleeve and secured to the slide valve operable to actuate the slide valve to open and closed positions.

9. A slide valve with removable intergrated internals comprising, a body provided with a flow passage therethrough including an enlarged internal portion, a body portion secured at one end to the body and having a projecting portion extending into the enlarged internal portion, the projecting portion having its side spaced from internal walls of the enlarged internal portion thereby forming a transverse space on each side of the projecting portion beyond direct flow through the flow of passage, a valve seat provided with a valve surface, the projecting body portion having a recess arranged to receive a portion of the valve seat, a slide valve slidable in the enlarged internal portion adjacent the valve surface and having the side members extending transversely into the transverse space beyond the direct flow in the flow passage, transversely spaced side members disposed in the transverse space on each side of the projecting portion, transversely-spaced tapered co-acting runs and runners on the side members and sides of the projecting portion arranged to remove clearances between the valve surface and the slide valve, the valve member fitting snuggly in the side members and the portion thereof in the recess whereby the side members and the valve member can be inserted as a unit into the enlarged internal portion of the valve member on the tapered runs, and the portion of the valve member snapped into the recess, the remainder thereof remaining fitted in the side members thereby locking the side members and valve member in position adjacent the projecting portion, and interfitting guides and slides operable for guiding the slide valve into open and closed positions adjacent the valve surface, the slides being disposed on the side members of the slide valve, and the guides being disposed in the side members, whereby the valve seat and guides are intergrated and are out of direct contact with the body and the guides and the slides are out of the direct flow path through the flow passage.

10. A slide valve with removable integrated internals comprising, a body provided with a flow passage therethrough including an enlarged internal portion, a cone suspended in the body in the external load-free relation with respect to the body and having a cylindrical projecting portion extending into the enlarged internal portion and forming a transverse space on each side of the cylindrical projecting portion out of direct flow through the flow passage, a valve seat having a valve surface, the projecting cylindrical portion having a recess arranged to receive a portion of the valve seat, transversely spaced side members disposed in the transverse space on each side of the cylindrical projecting portion, transversely spaced tapered coacting runs and runners on the side members and sides of the projecting cylindrical portion arranged to remove clearances between the valve surface and a slide valve, the valve seat fitting snuggly in the side members and a portion thereof in the recess whereby the side members and the valve seat can be inserted as a unit into the enlarged internal portion of the body on the tapered runs, and the portion of the valve seat snapped into the recess with the remainder thereof remaining fitted in the side members thereby locking the side members and the valve seat in position adjacent the cylindrical projecting portion, a slide valve slidable in the enlarged internal portion adjacent to the valve surface and having transversely spaced slides extending into the transverse space on each side of the projecting portion, transversely spaced guides in the side members co-acting and interfitting with the slides whereby the interfitting guides and slides are disposed out of the direct flow path through the flow passage and guide sliding movement of the slide valve for opening and closing the valve, the body having an opening of a size permitting insertion in and withdrawal from the body of the valve member, the side members and the slide valve therethrough, and a closure removably secured to the body closing the opening.

11. A slide valve with removable integrated internals comprising, a body provided with a flow passage therethrough including an enlarged internal portion, a cone suspended in the body in external load-free relation and having a cylindrical projecting portion extending into the enlarged internal portion and forming a transverse space on each side of the projecting portion out of contact with the body and out of direct flow through the flow passage, a valve seat having a valve surface releasably secured to the cylindrical portion, transversely-spaced side members releasably secured to the cylindrical projecting portion, said side members disposed in the transverse space in the enlarged internal portion out of contact with the body and out of the direct flow through the flow passage, transversely spaced guides in the side members, a slide valve slidable in the enlarged internal portion adjacent to the valve surface and having transversely-spaced slides co-acting and interfitting with the guides, whereby the interfitting guides and slides are disposed out of the direct flow path through the flow passage and guide sliding movement of the slide valve for opening and closing the valve, whereby the valve seat and guides are integrated by both being releasably secured to the cylindrical projecting portion and by being out of direct contact with the body permitting external settable clearances between the valve seat and the slide valve which remain fixed under temperature or pressure excursions, the body having an opening of a size sufficient to permit insertion in and withdrawal from the body of the valve seat, the slide valve and its slides, and the side members therethrough, and a removable cover closing the opening.

12. The slide valve of claim 11 where, the side members are integral with the valve seat.

13. The slide valve of claim 11 where, the slide valve comprises a pair of slide valves disposed in end-to-end relationship with respect to one another for opening and closing the valve.

14. The slide valve of claim 11 including, a bearing sleeve removably secured to the valve body, and an actuator stem removably extending through the bearing sleeve and secured to the slide valve for actuating the slide valve to open and closed positions.

15. The slide valve of claim 11 where, the body includes an outer shell and an inner shell to provide an insulation space about the flow passage, and the enlarged internal portion and includes an insulating compartment adjacent the removable cover, insulating material disposed in the insulation space, additional insulation material removably disposed within the insulating compartment, the cover provided with an opening, and including a bearing sleeve removably disposed in the insulating compartment in communication with the opening and the slide valve, and an actuator stem movably extending through the opening and the bearing sleeve and secured to the slide valve for actuating the slide valve to open and closed positions.

* * * * *